United States Patent [19]

Arimoto et al.

[11] Patent Number: 5,025,268
[45] Date of Patent: Jun. 18, 1991

[54] OPTICAL SCANNING APPARATUS AND ASYMMETRICAL ASPHERIC SCANNING LENS

[75] Inventors: Akira Arimoto, Kodaira; Susumu Saito, Hachioji; Yoshito Tsunoda, Tokyo; Shigeo Moriyama, Tama; Takeshi Mochizuki, Mito, all of Japan

[73] Assignees: Hitachi, Ltd.; Hitachi Koki Co., Ltd., both of Tokyo, Japan

[21] Appl. No.: 377,325

[22] Filed: Jul. 10, 1989

[30] Foreign Application Priority Data

Jul. 13, 1988 [JP] Japan ................. 63-172724

[51] Int. Cl.⁵ ............................................. H04N 1/21
[52] U.S. Cl. ..................................... 346/108; 350/6.5
[58] Field of Search ........................ 346/107 R, 108; 350/6.5, 6.7, 6.8; 250/236

[56] References Cited

U.S. PATENT DOCUMENTS

| | | | |
|---|---|---|---|
| 4,804,981 | 2/1989 | Prakash | 346/108 |
| 4,823,002 | 4/1989 | Saito | 346/108 |
| 4,882,483 | 11/1989 | Mochizuki | 350/6.8 |

FOREIGN PATENT DOCUMENTS

| | | |
|---|---|---|
| 48-49315 | 7/1973 | Japan . |
| 48-98844 | 12/1973 | Japan . |
| 57-144515 | 9/1982 | Japan . |
| 59-9883 | 3/1984 | Japan . |
| 62-265615 | 11/1987 | Japan . |

*Primary Examiner*—Mark J. Reinhart
*Attorney, Agent, or Firm*—Fay, Sharpe, Beall, Fagan, Minnich & McKee

[57] ABSTRACT

An optical scanning apparatus has a scanning lens with a rotationally asymmetric aspheric surface having individual curvature radii in the main scanning direction and in the sub-scanning direction. The curvature radius in the sub-scanning direction is asymmetrically increased in the lateral direction with the distance from the optical axis. A field curvature aberration which may be generated in the sub-scanning direction on the scanning surface due to an oblique incident of optical beams on the rotating polygonal mirror or the movement of the reflective surface caused by rotation of the rotating polygonal mirror is compensated for by the scanning lens and the focusing properties of the system can be kept at a level of high resolving power.

14 Claims, 6 Drawing Sheets

Z : COORDINATE WHERE ASPHERIC SURFACE IS z=0

Z' : COORDINATE WHERE PHOTOSENSITIVE DRUM SURFACE IS z=0

β : INCIDENTAL ANGLE OF LASER BEAM WITH RESPECT TO z=AXIS

FIG. I
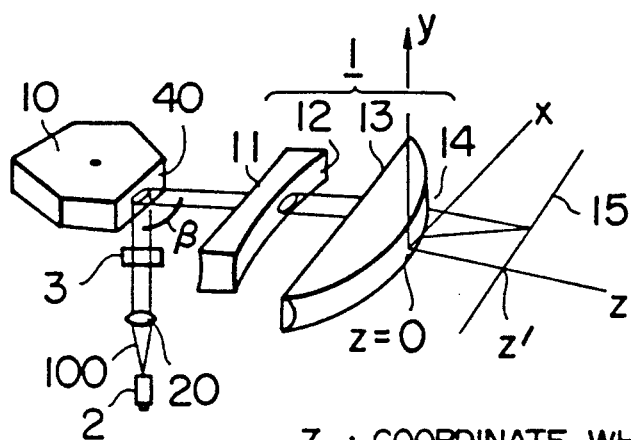
Z : COORDINATE WHERE ASPHERIC SURFACE IS z=0
Z' : COORDINATE WHERE PHOTOSENSITIVE DRUM SURFACE IS z=0
β : INCIDENTAL ANGLE OF LASER BEAM WITH RESPECT TO z-AXIS
FIG. 2
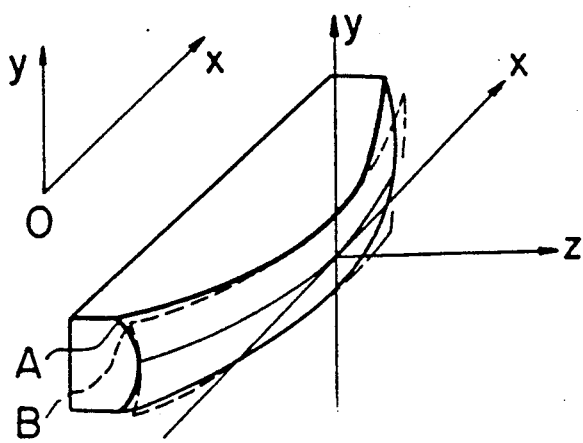

OPTICAL SCANNING APPARATUS AND ASYMMETRICAL ASPHERIC SCANNING LENS

BACKGROUND OF THE INVENTION

1. Field of the Invention

The present invention relates to an optical scanning apparatus, and more particularly to an optical scanning apparatus comprising a scanning optical system which employs a rotationally asymmetric aspheric surface and is suitable for a laser printer that is used as a computer output peripheral or an office information processing apparatus. The present invention further relates to a rotationally asymmetric aspheric scanning lens that is used for the optical scanning apparatus.

2. Description of the Prior Art

In laser printers, a structure has been employed which is arranged such that the laser beam is deflected to scan a photosensitive drum by the combination of an $F\theta$ lens and a rotating polygonal mirror. One of the problems that is encountered in scanning the laser beam is that scanning pitch errors are generated due to a tilt of reflective surfaces of the rotating polygonal mirror.

In order to obviate this problem, there have been proposed various methods for reducing adverse affects due to the tilt error of the rotating polygonal mirror by means of the combination of a cylindrical lens and a toric $F\theta$ lens (see Japanese Patent Unexamined Publication No. 48-98844), the combination of a prism and an $F\theta$ lens (see Japanese Patent Examined Publication No. 59-9883), the combination of a toric lens and an $F\theta$ lens (see Japanese Patent Unexamined Publication No. 48-49315) and the like. However, these methods suffer from difficulties in which an increased number of components must be used due to the use of two kinds of optical elements such as an asymmetrical optical element and an $F\theta$ lens as described above. In order to overcome these difficulties, it has also been proposed to impart the function of compensating for scanning pitch errors due to the tilt of the polygonal mirror in the $F\theta$ lens (see Japanese Patent Unexamined Publication No. 57-144515). An $F\theta$ lens of the type according to this proposal is provided with a cylindrical surface or a toric surface as well as ordinary spherical surfaces or planar surfaces. Assuming that a first plane is perpendicular to a second plane, the "toric surface" means a surface having different radii of curvature in the first and second planes. Namely, the toric surface is expressed by the following secondary expansion equation:

$$z = Ax^2 + By^2 \quad \ldots \quad (1)$$

where z corresponds to the optical axis, xz and yz correspond to the surfaces that are perpendicular to each other and that include the optical axis, and A and B are coefficients, in which $A \neq B$ holds, and in which A and B are independent of the view angle $\theta$ relative to the optical axis.

In a laser scanning apparatus in which the above-described toric surface is employed, assuming that the optical scanning surface is xz, the surface which affects the surface tilt is yz, the main scanning direction is x, the sub-scanning direction is y, and the focal lengths within each of the surfaces are fx and fy, respectively, the following relationship holds:

$$fx \neq fy, \text{ and } fx > fy \quad \ldots \quad (2)$$

In particular, the focusing properties in the surface-tilt direction (sub-scanning direction) can deteriorate as can be clearly seen from the above-described formula. The reason for this lies in that the region that can be scanned by fx is limited since $fx > fy$, causing excellent focusing properties to be prevented from being satisfied. The reason for the deterioration in the focusing properties in the sub-scanning direction resides in a field curvature aberration that is generated in the surface (surface yz) relating to the surface tilt. That is, the wave aberration at a specific view angle $\theta$ becomes as follows:

$$W = cy^2 \ldots \quad (3)$$

where c corresponds to a coefficient. On the other hand, the focusing properties in the main scanning direction can be kept in a good condition when $\theta$ is 40° or less. That is, an aberration is generated only in the surface tilt compensation direction (the direction of y-axis and sub-scanning direction) since W is brought to a non-functional relationship with x. Since c corresponds to a coefficient determined by the curvature radius, interval between lenses, refraction factor, view angle and the like, it cannot become zero due to a deterioration in the focusing properties if the contour of the lens surface is as such expressed by Equation (1). Another problem arises in that the alignment adjustment by means of rotating of the lenses is difficult to conduct since a plurality of aspheric surfaces are provided in the $f\theta$ lens.

To this end, the inventors of the present invention have proposed (Japanese Patent Unexamined Publication No. 62-265615 or U.S. Ser. No. 179,407) a structure arranged such that the number of the aspheric surfaces of the scanning lens ($f\theta$ lens) is decreased to one and the shape of this aspheric surface is arranged to be that as expressed by the following equation:

$$z = Ax^2 + B'(\theta) \cdot y^2 \quad (4)$$

$$(B' \geqq B)$$

wherein a coefficient B' is a function of a scanning view angle $\theta$, and the curvature radius of the $f\theta$ lens in the surface tilt direction is changed in correspondence with the deflection direction. According to this proposal, the coefficient of the term $y^2$ of the wave aberration W can be brought to come closer to 0 by arranging the curvature radius in the surface tilt direction (sub-scanning direction) to become larger with the distance from the optical axis (axis z) as shown in dashed line Ⓑ. This means that the focal distance fy in the sub-scanning direction is a function of the view angle $\theta$ so that fy is also changed in correspondence with the change in the view angle $\theta$. In this proposal, the change in the curvature radius in the sub-scanning direction is symmetric with respect to the optical axis. Referring to FIG. 2, z-axis corresponds to the direction of the optical axis, while the yz surface is the surface that affects the surface tilt. Referring to this drawing, a continuous line Ⓐ represents a conventional toric surface expressed by the following equation:

$$z = By^2 + M \ldots \quad (5)$$

Thus, the focusing position can be brought to any position on the surface of the photosensitive drum by arranging the curvature radius in the sub-scanning direction to become larger with the distance from the optical axis as designated by the dashed line and by making the curvature radius outside the axis ($\theta \neq 0$) larger than that in the surface tilt direction on the optical axis ($\theta = 0$) so as to be an aspheric surface Ⓑ. Furthermore, the thus-arranged curvature radius is, together with the view angle $\theta$, monotone-increased bisymmetrically.

SUMMARY OF THE INVENTION

It is an object of the present invention to provide an optical scanning apparatus and a rotationally asymmetric aspheric scanning lens used for this optical scanning apparatus. This scanning apparatus is capable of preventing the influence due to the movement of the imaging point in the sub-scanning direction generated with rotation of the rotating polygonal mirror. It has the function of compensating for scanning pitch errors due to the tilt of the polygonal mirror with which wide view angle scanning can be performed while exhibiting an excellent resolving power.

An optical scanning apparatus according to the present invention comprises:

a light source;

a rotating polygonal mirror for deflecting optical beam emitted from the light source so that the beam scans a scanning surface;

a scanning lens disposed between the rotating polygonal mirror and the scanning surface, capable of imaging the rotating polygonal mirror and the scanning surface in a conjugate relationship with respect to a sub-scanning direction which is perpendicular to the main scanning direction to be scanned by the rotating polygonal mirror and as well imaging the optical beams which has been deflected at the reflective surface of the rotating polygonal mirror at the position on the scanning surface in proportion to its scanning angle. The scanning lens has an aspheric surface having individual curvature radii in the main scanning direction and in the sub-scanning direction and arranged such that the curvature radius in the sub-scanning direction thereof is increased with the distance from the optical axis asymmetrically in the lateral direction; and an optical system disposed between the light source and the rotating polygonal mirror and capable of converging the optical beams emitted from the light source with respect to the sub-scanning direction and making the optical beams obliquely incident upon, with respect to the optical axis of the scanning lens, the reflective surface of the rotating polygonal mirror to form an elongated shape in the main scanning direction on the reflective surface of the rotating polygonal mirror.

That is, according to the present invention, the reflective surface of the rotating polygonal mirror and the surface of the photosensitive drum are disposed in a conjugate imaging relationship with respect to the sub-scanning direction with the scanning lens for the purpose of compensating for the scanning pitch error due to surface tilt of the rotating polygonal mirror. Furthermore, an F$\theta$ lens is used which has a rotationally asymmetric aspheric surface having individual curvature radii in the main scanning direction and in the sub-scanning direction and the curvature radius in the sub-scanning direction which is monotone and asymmetrically increased with the distance from the optical axis so that a field curvature aberration (an abberation generated due to oblique incident of optical beams upon the rotating polygonal mirror or the movement of the reflective surface of the rotating polygonal mirror included) is compensated for, where the F$\theta$ lens is a lens for imaging beams at the position on the scanning surface in proportion to the deflection angle (scanning view angle) $\theta$ of the optical beams deflected by the reflective surface of the rotating polygonal mirror.

The rotationally asymmetric aspheric surface is designed in such a manner that the shape thereof is arranged to have an individual curvature radius of the principle axis and of the conjugate axis, the curvature radius of the conjugate axis is increased with the distance from the axis ($\theta \neq 0$), and this shape is further arranged to be asymmetric with respect to the scanning center ($\theta = 0$). The thus-arranged aspheric surface may be disposed on any surface of the lens forming the F$\theta$ lens, it being preferable to be disposed on the surface which is the most close to the scanning surface (the surface of the photosensitive drum). For example, the aspheric scanning lens according to the present invention is formed by two lenses in which it is assumed that the surfaces counted from the incidental side (rotating polygonal mirror side) are the first to the fourth surfaces, the first to the third surfaces are arranged to be rotationally symmetric surfaces formed by a spheric surface and the fourth surface is arranged to be a rotationally asymmetric aspheric surface.

The aspheric scanning lens according to the present invention comprises an F$\theta$ lens imaging the rotating polygonal mirror and the scanning surface in a conjugate relationship with respect to the sub-scanning direction which is perpendicular to the main scanning direction to be scanned by the rotating polygonal mirror and imaging optical beams deflected by the reflective surface of the rotating polygonal mirror at the position on the scanning surface in proportion to the scanning angle. The F$\theta$ lens comprises a lens having individual focal length in the main scanning direction and in the sub-scanning direction and the focal length in the sub-scanning direction is asymmetrically increased with the distance from the optical axis.

According to the present invention, field curvature aberration generated in the sub-scanning direction on the scanning surface (photosensitive drum) due to the oblique incidence of the optical beams (for example, laser beams) upon the rotating polygonal mirror and the movement of the reflective surface of the rotating polygonal mirror can be compensated so that the imaging point can align to the scanning surface. Consequently, scanning with a high resolution and a wide view angle can be performed.

BRIEF DESCRIPTION OF THE DRAWINGS

FIG. 1 is a view which illustrates an optical scanning apparatus according to the present invention;

FIG. 2 is a view which illustrates an example of a conventional aspheric surface;

DETAILED DESCRIPTION OF THE PREFERRED EMBODIMENT

Before describing an embodiment of the present invention, problems overcome by the present invention will be described.

Figure 3:
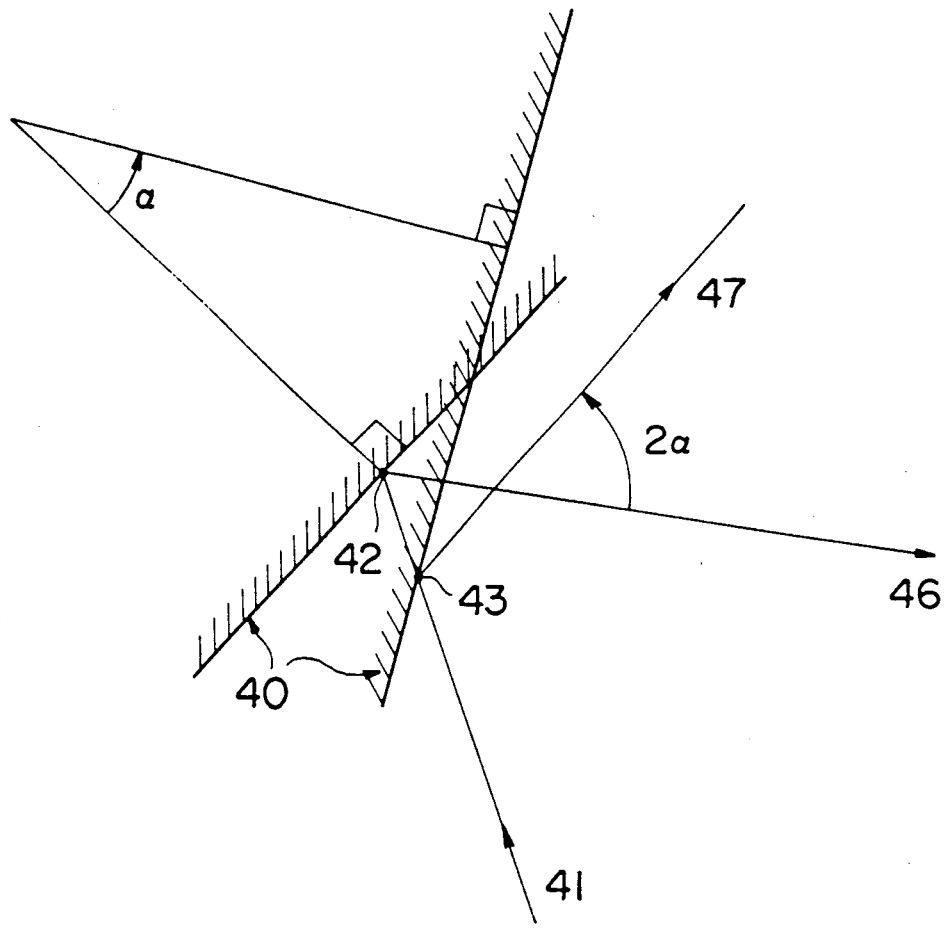
FIG. 3 is a view which illustrates the movement of a reflective surface of a rotating polygonal mirror.

In laser printers, a rotating polygonal mirror is employed as a scanning means in which optical beams, for example, laser beams, transmitted from a light source, for example, a laser beam source, are obliquely made incident upon the rotating polygonal mirror. That is, laser beams are obliquely made incident upon the reflective surface of the rotating polygonal mirror within the scanning plane (surface xz) with respect to the optical axis (axis z). As shown in FIG. 3, a reflective surface 40 of a rotating polygonal mirror moves forward and backward with respect to an incidental laser beam 41. Therefore, the incidental point of the incidental laser beam 41 is changed from 42 to 43, and its reflected light also is changed from 46 to 47. Although such a movement of the reflective surface does not cause any problem in the above-described case disclosed in Japanese Patent Unexamined Publication No. 62-265615 in which parallel beams are made incident upon the reflective surface of a rotating polygonal mirror, the spot on the surface of the photosensitive drum is moved in the direction of the optical axis when the reflective surface 40 is moved in a case where the reflective surface of the rotating polygonal mirror and the surface of the photosensitive drum are so disposed in a conjugate focusing relationship with respect to the sub-scanning direction (y-direction) for the purpose of compensating for the surface tilt of the rotating polygonal mirror as to cause the laser beam 41 to be made incident upon the reflective surface of the rotating polygonal mirror to be converged to a sole point with respect to the sub-scanning direction. When the view angle is $\theta$, the movement of this image point becomes:

$$a\theta + b\theta^2 + c\theta^3 + \ldots,$$

Figure 4:
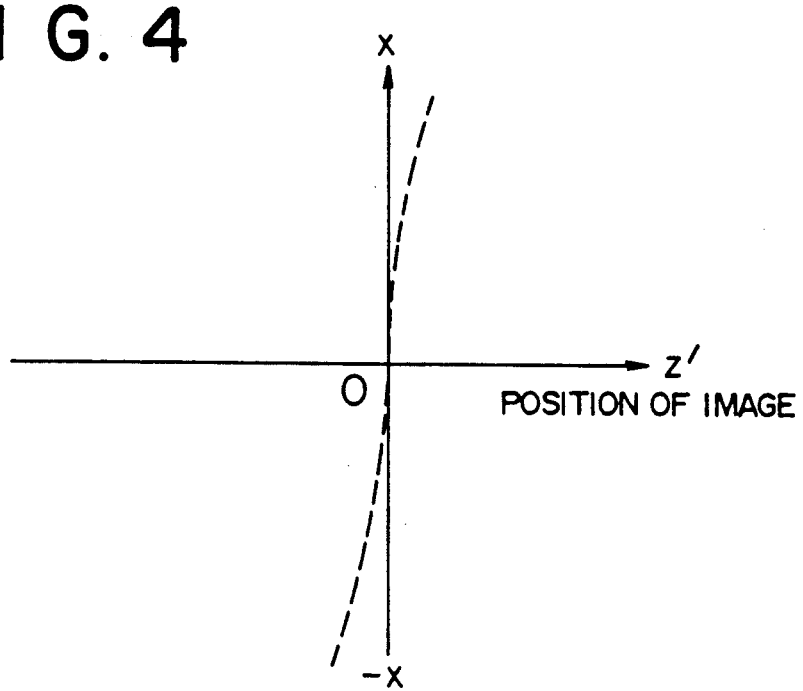
FIG. 4 is a view which illustrates the field curvature.

As is shown, odd functional terms are contained in the terms of the view angle $\theta$. When the laser beam to be scanned after it has been made obliquely incident upon the reflective surface of a rotating polygonal mirror is imaged by a scanning lens comprising an aspheric surface formed such that the curvature radius in the sub-scanning direction is bisymmetric with respect to the optical axis, the imaging point in the sub-scanning direction cannot be on the scanning surface (cannot be on the surface of the photosensitive drum) as designated by a dashed line shown in FIG. 4. That is, the image does not tilt even if laser beams are obliquely made incident upon the reflective surface to be imaged by using a bisymmetric and aspheric scanning lens in laser scanning systems comprising a scanning device such as a galvano mirror in which the rotational axis and the reflective surface are made to coincide with each other. However, when a rotating polygonal mirror in which the center of rotation is not on the reflective surface is used, the spot on the scanning surface inevitably moves, as described above, in the direction of the optical axis in accordance with the movement of the reflective surface. As a result, the imaging point positioned in the sub-scanning direction does not meet the scanning surface as designated by the dashed line shown in FIG. 4. In FIG. 4, the fact that the imaging point deflects in the negative value direction necessitates the curvature radius $R-x$ in the sub-scanning direction to be made larger with the distance from the optical axis as to move the imaging point on to the surface of the photosensitive drum (position at which $z'=0$) which serves as a scanning surface. On the other hand, the fact that the imaging point deflects in the positive value direction necessitates the curvature radius $R+x$ in the sub-scanning direction to be made smaller on the contrary. Therefore, according to the present invention, a rotationally asymmetric aspheric surface is employed, this surface being arranged such that the principle axis and the conjugate axis have individual curvature radii, the curvature radius of the conjugate axis is increased with the distance from the axis, monotone increased, and the shape is arranged to be asymmetric in the lateral direction with respect to the scanning center. As a result, the field curvature aberration in the sub-scanning direction on the scanning surface due to the oblique incident upon the polygonal mirror or the movement of the reflective surface in correspondence with the rotation of the rotating polygonal mirror can be compensated to make the imaging point coincide on the scanning surface so that the focusing properties can be improved to a level of high resolving power.

The aspheric scanning lens according to the present invention comprises an $f\theta$ lens which images an optical beam at a position on the scanning surface that is in proportion to the scanning angle. The optical beam is imaged in a conjugate relationship between the rotating polygonal mirror and the scanning surface with respect to the sub-scanning direction which is perpendicular to the main scanning direction to be scanned by the rotating polygonal mirror and reflected from the reflective surface of this rotating polygonal mirror. The above-described $f\theta$ lens has individual focal lengths in the main scanning direction and in the sub-scanning direction and the focal length in the sub-scanning direction is increased asymmetrically in the lateral direction with the distance from the optical axis.

Figure 6:
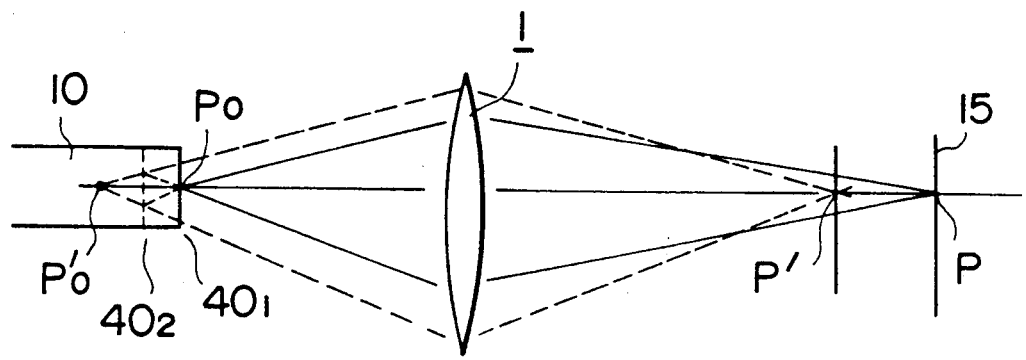
FIG. 6 is a view which illustrates the movement of the image due to the positional accuracy of the rotating polygonal mirror and the scanning lens.

It is preferable for the lateral magnification of the scanning lens according to the present invention to be arranged to be. That is, assuming that the radius of the rotating polygonal mirror is 30 to 50 mm$\phi$, the movement of the reflective surface of the rotating polygonal mirror becomes substantially 1 mm. The field curvature aberration due to the movement described above can be, as described above, eliminated by using an aspheric surface having an asymmetric curvature radius in the lateral direction. Upon consideration of the positional accuracy of the rotating polygonal mirror and the scanning lens, assuming that the reflective surface 40 is positioned at a position $40_2$ moved by, for example, 0.3 mm from the designed position $40_1$, position $p_0$ of the reflected image becomes, as designated by a dashed line shown in FIG. 6, position $p_0'$ which is moved by substantially 0.6 mm which is twice the above-described deflection 0.3 mm. As a result of the movement of the imaging point P on the surface of the photosensitive drum which is square the lateral magnification of a scanning lens, it is moved to the point P'. Assuming that the lateral magnification is 3 to 5, the movement PP' on the surface of the photosensitive drum becomes 5.4 to 15 mm. The F-number of the scanning lens of a scanning apparatus such as a laser printer and the like is approximately 100. The focal depth is given in the form of a PP value expressed by:

$$4F^2 \cdot \lambda$$

A focal depth of approximately 15 mm is obtained by using a value $2F^2\lambda$ which is a result of the distribution of the above-described value $4F^2 \cdot \lambda$ in both the positive side and the negative side and by assuming that the wave length of the beam to be employed is $\lambda = 0.78$ μm. Therefore the rotating polygonal mirror and the scanning lens can be disposed within the range of the foal depth with a positional accuracy of 0.3 mm or less by arranging the lateral magnification of the scanning lens to be 3 to 5, which will be preferable in terms of the manufacturing yield. If the lateral magnification exceeds 5, a precise positional accuracy needs to be provided for the rotating polygonal mirror and the scanning lens, causing a difficulty in assembling the apparatus. On the other hand, if the same is smaller than 3, the scanning lens needs to be brought closer to the photosensitive drum, causing a problem in that the diameter of the lens needs to be enlarged.

FIG. 1 is a structural view of a laser printer serving as an embodiment of an optical scanning apparatus according to the present invention. Reference numeral 1 represents a rotationally asymmetric aspheric Fθ lens, 2 represents a laser beam source, 20 represents a collimator lens, 3 represents a cylindrical lens, 10 represents a rotating polygonal mirror, and 15 represents a photosensitive drum surface.

Laser beams 100 emitted from the laser beam source 2 pass through the collimator lens 20 so as to become parallel beams. The cylindrical lens 3 is disposed to only act in the sub-scanning direction (y-direction). As a result, the laser beams from the collimator lens 20 are converged on the reflective surface 40 of the rotating polygonal mirror 10 in the sub-scanning direction, that is in the y-direction, while parallel optical beams are made incident in the main scanning direction so that an elongated spot is irradiated. This reflective surface 40 and the scanning surface 15 in which the photosensitive drum is disposed are in the geometric optical, conjugate relationship with respect to a sub-scanning direction, that is in y-direction. The scanning lens (fθ lens) 1 for performing the laser scanning comprises: a first lens including lens surfaces 11 and 12 each having a rotational symmetric axis formed by a spheric surface or a plane; and a second lens including a lens surface 13 formed by a plane or a spheric surface and a lens surface 14 comprising a rotationally asymmetric aspheric surface. The thus-formed scanning lens 1 acts to converge parallel beams, deflected by the rotating polygonal mirror, to the scanning surface (the surface of the photosensitive drum) 15 when imaging in the main scanning direction (x-direction) is performed.

The specifications of the scanning lens 1 are shown in Table 1. Referring to Table 1, ① corresponds to the reflective surface 40 of the rotating polygonal mirror 10, ② to ⑤ correspond to surfaces of the scanning lens 1 wherein ② corresponds to the lens surface 11 formed by a spheric surface having a rotationally symmetric axis, ③ and ④ correspond to lens surfaces 12 and 13 each of which is formed by a plane, ⑤ corresponds to the lens surface 14 formed by rotationally asymmetric aspheric surface, and ⑥ corresponds to the surface of the photosensitive drum, where r represents a curvature radius, d represents a distance between surfaces, and n represents a refractive index. The values of r illustrated in Table 1 are given either a plus or a minus sign on the basis of the direction of the surface. The case of the minus sign corresponds to the fact that the curvature center is positioned on the negative side of the surface when the beams pass in the direction from the minus side to the plus side.

TABLE 1

|   | r (mm) |   | d (mm) | n |
|---|---|---|---|---|
| ① | ∞ |   | 25 | Air |
| ② | −289.2 |   | 7.5 | 1.712303 |
| ③ | ∞ |   | 44.5 | Air |
| ④ | ∞ |   |   |   |
| ⑤ | −49.22 conjugate axis | −155.7 principle axis | 18.0 | 1.712303 |
| ⑥ | surface of the photosensitive drum |   | 412.18 | Air |

Figure 5:
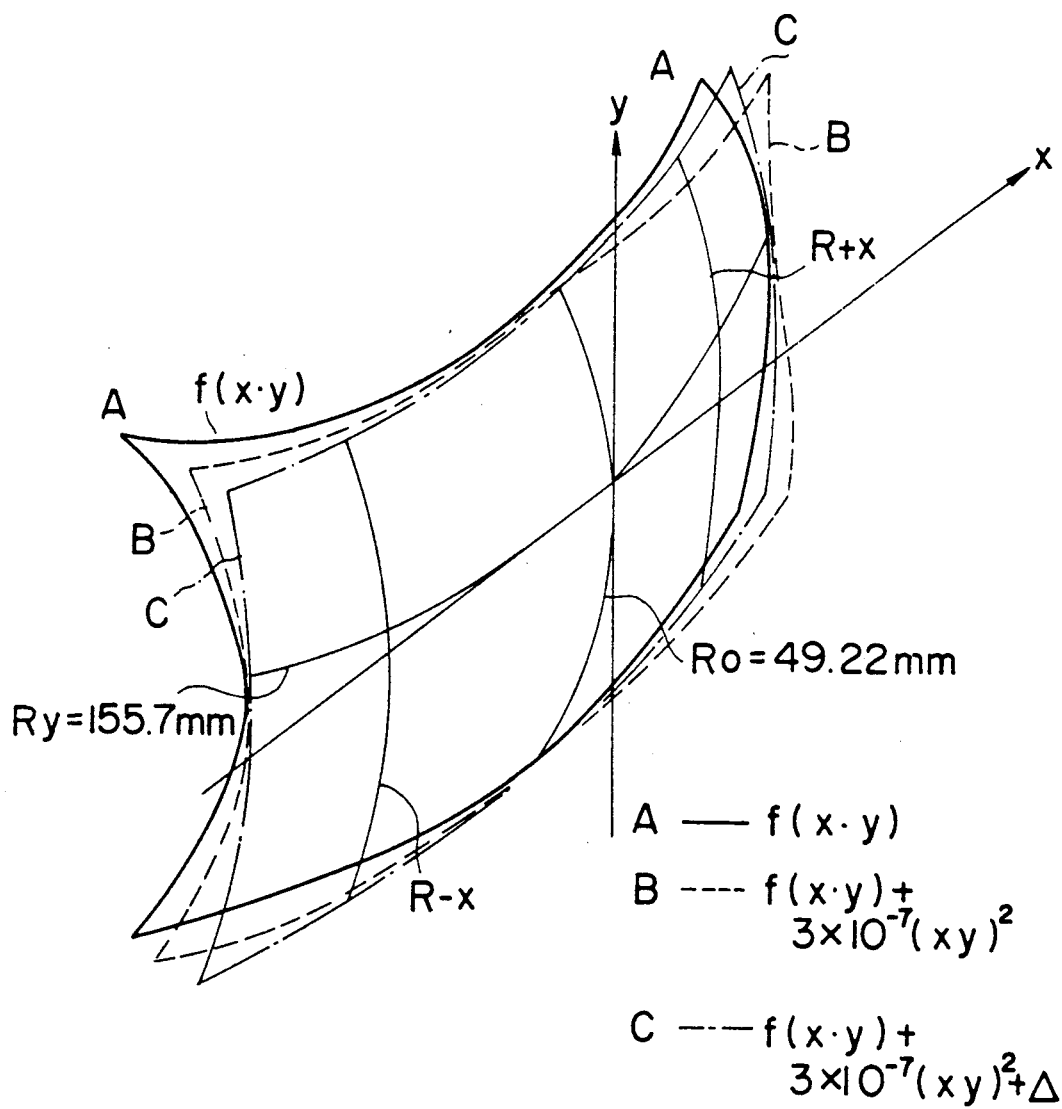
FIG. 5 is a view which illustrates an example of the aspheric surface employed in a scanning lens according to the present invention.

This scanning lens 1 is characterized by the aspheric surface 14 in ⑤. FIG. 5 is a view which illustrates an example of the shape of an aspheric surface 14 according to the present invention. Referring to FIG. 5, Ro represents a curvature radius in the sub-scanning direction at the scanning center ($\theta = 0$), R+x and R−x represent sub-scanning curvature radius in the plus x direction and in the minus x direction, respectively, in which the relationship $R+x \neq R-x$ holds. Specifically, the aspheric asymmetric surface 14 according to the present invention is designated by an alternate long and short dashed line Ⓒ obtained by adding a value of $3 \times 10^{-7}$ $(xy)^2$ at coordinates (x, y) (designated by a dashed line Ⓑ) to a toric surface f (x, y) (designated by a continuous line Ⓐ) arranged such that the absolute value of the curvature radius Ry in the main scanning direction is 155.7 mm, the absolute value of the curvature radius Ro in the sub-scanning direction is 49.22 mm and further adding the value Δ at coordinates (x, y) to the former. The symbol Δ represents, for example, values shown in Table 2, each of the values Δ being values to be added at coordinates (x, y) so that the lens surface is moved in the z-direction (in the direction of the optical axis) by a distance given by Δ. The values at coordinates (x, y) which are not shown in Table 2 are given by a multinominal approximation using sample points shown in Table 2. The lateral magnification of this scanning lens in the sub-scanning direction is substantially 4.5.

TABLE 2

| ASYMMETRIC SPLINE DATA | | | |
|---|---|---|---|
| Y | Δ | Y | Δ |
| X = −47.2500000 | | | |
| −8.0000000 | 0.0050000 | −4.0000000 | 0.0012500 |
| 0.0 | 0.0 | 4.0000000 | 0.0012500 |
| 8.0000000 | 0.0050000 | | |
| X = −31.0200000 | | | |
| −8.0000000 | 0.0028000 | −4.0000000 | 0.0007000 |
| 0.0 | 0.0 | 4.0000000 | 0.0007000 |
| 8.0000000 | 0.0028000 | | |
| X = 0.0 | | | |
| −7.5000000 | 0.0 | −3.7500000 | 0.0 |
| 0.0 | 0.0 | 3.7500000 | 0.0 |
| 7.5000000 | 0.0 | | |
| X = 32.0800000 | | | |
| −8.0000000 | −0.0032000 | −4.0000000 | −0.0008000 |
| 0.0 | 0.0 | 4.0000000 | −0.0008000 |
| 8.0000000 | −0.0032000 | | |
| X = 49.7100000 | | | |
| −8.0000000 | −0.0052000 | −4.0000000 | −0.0013000 |
| 0.0 | 0.0 | 4.0000000 | −0.0013000 |

TABLE 2-continued

| ASYMMETRIC SPLINE DATA | | | |
|---|---|---|---|
| Y | Δ | Y | Δ |
| 8.0000000 | −0.0052000 | | |

Figure 7:
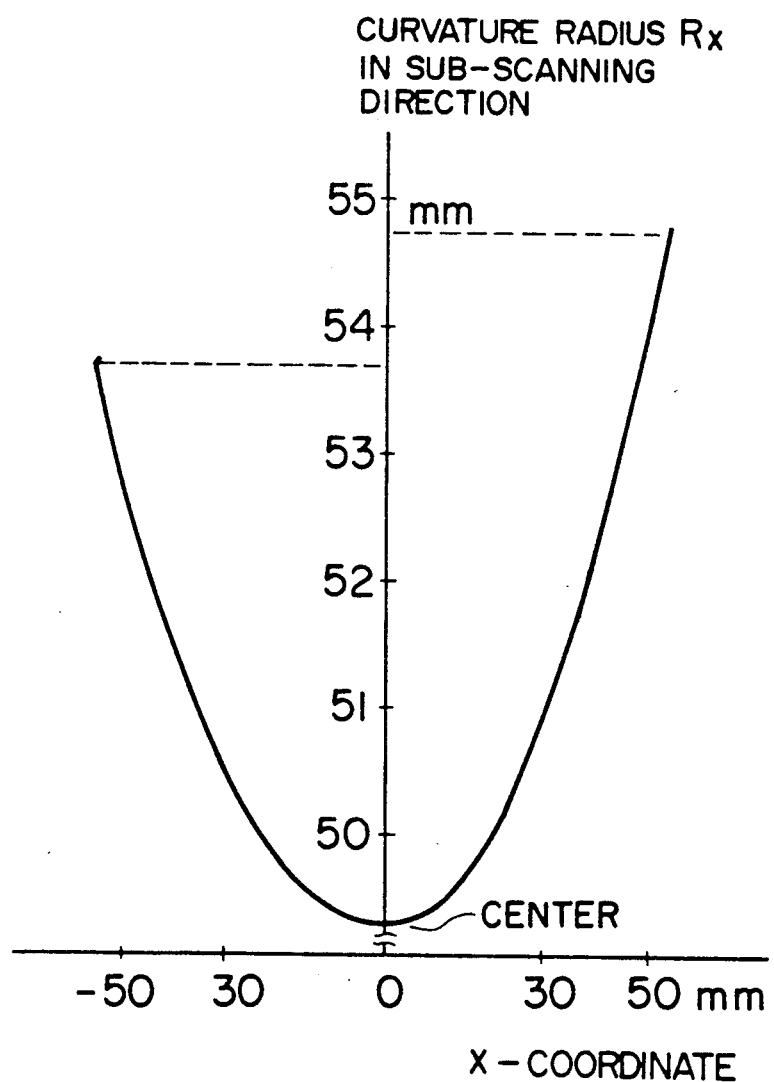
FIG. 7 is a view which illustrates change in the curvature radius of the aspheric surface in the sub-scanning direction and according to the present invention.

As is shown from Table 2, since the values Δ have signs which are inverted signs of the signs of x, it is apparent that the aspheric surface designated by © shown in FIG. 5 has a shape that has asymmetric Z ordinates with respect to a bisection along the ye axis. The curvature radius Rx in the sub-scanning direction becomes, as shown in FIG. 7, asymmetric with respect to the scanning center ($\theta=0$). In the example shown in FIG. 7, the curvature radius in the sub-scanning direction becomes Ro=49.22 mm and that at each end becomes, in an asymmetric manner, a value $R-x=53.7$ mm and $R+x=54.7$ mm. Such aspheric surfaces can be obtained by a direct machining using a numerically-controlled (NC) grinding machine.

Figure 9:
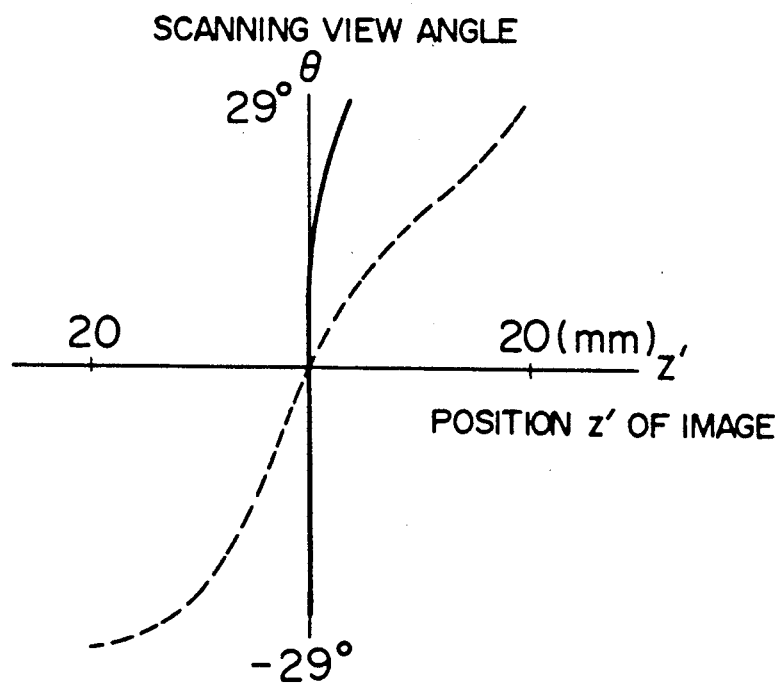
FIG. 9 is a view which illustrates the focusing properties according to the present invention and that of the conventional example.
Figure 8:
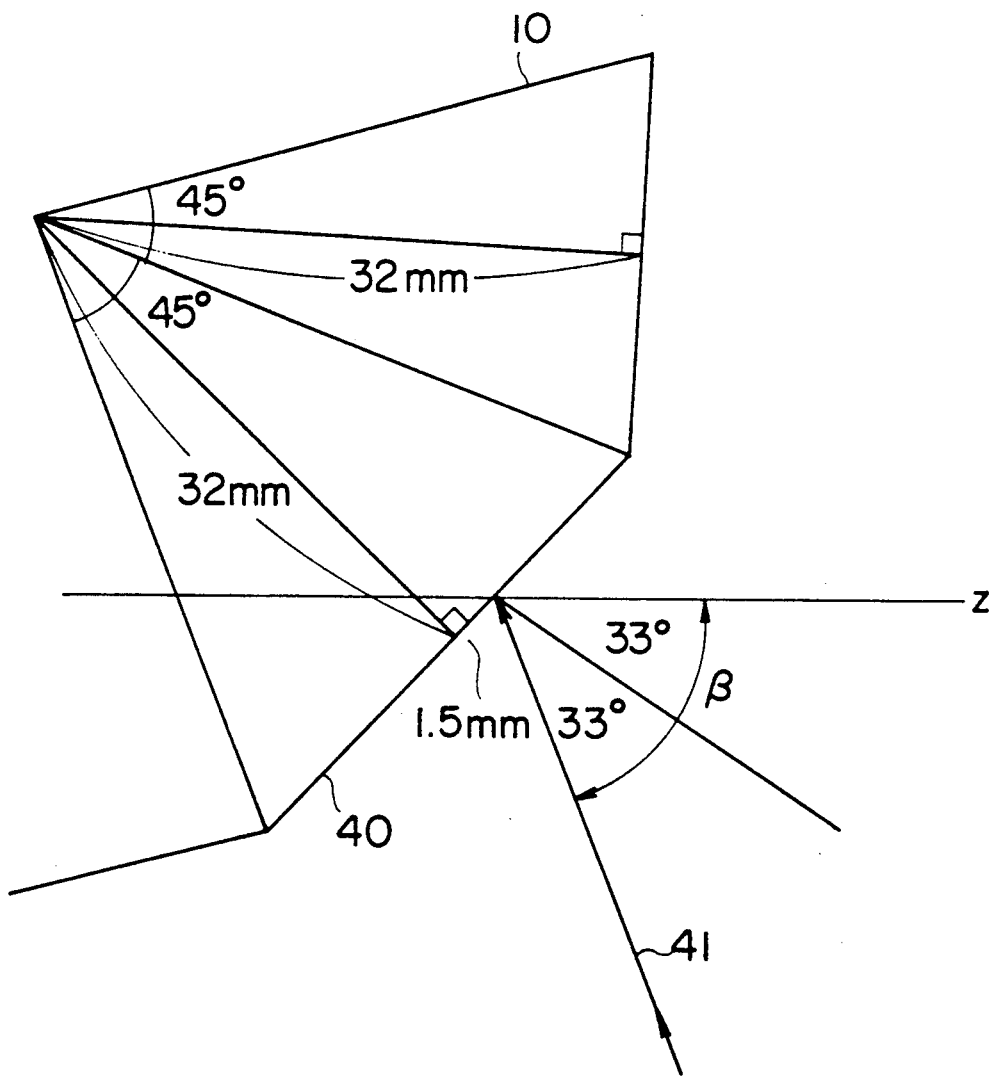
FIG. 8 is a view which illustrates the relationship between the rotating polygonal mirror and the incidental angles.

According to this embodiment, the rotating polygonal mirror 10 is arranged such that its radius of is 32 mm, the number of the surfaces is 8, the incidental angle β of the laser beam 41 is 66°, and the configuration with respect to the optical axis (z-axis) is as shown in FIG. 8. When the laser beams scanned by this rotating polygonal mirror 10 are imaged by the above-described scanning lens 1, focusing properties can be obtained such that the field curvature aberration can be restricted within 2 mm in the range of the scanning view angle $\theta$ of $\pm 29°$ as designated by a continuous line shown in FIG. 9. As a result, a uniform converged spot $60 \times 100$ μm was obtained. The dashed line shown in FIG. 9 designates the position of the image surface in the sub-scanning direction when any asymmetric surface is not added (when there is no value Δ). Therefore, it is apparent that the difference between this dashed line and the continuous line can be compensated by Δ.

As described above, any field curvature aberration which can be generated in the sub-scanning direction when laser beams are diagonally made incident upon the rotating polygonal mirror can be eliminated by arranging the surface of the scanning lens to be asymmetric with respect to the scanning optical axis. Consequently, a scanning having a surface tilt compensation function, exhibiting high resolution power and wide view angle can be conducted.

What is claimed is:

1. An optical scanning apparatus comprising:
a light source for emitting optical beams;
a rotating polygonal mirror for deflecting said optical beams so that the beams scan a scanning surface;
a scanning lens with an optical axis disposed between said rotating polygonal mirror and said scanning surface for imaging said rotating polygonal mirror and said scanning surface in a conjugate relationship with respect to a sub-scanning direction (y) which is perpendicular to a main scanning direction (x) to be scanned by said rotating polygonal mirror and for imaging said optical beams which have been deflected at the reflective surface of said rotating polygonal mirror at a position on said scanning surface in proportion to its scanning angle, said scanning lens having an aspheric surface having individual curvature radii in the main scanning direction and the sub-scanning direction, wherein the curvature radius in the sub-scanning direction is increased asymmetrically with respect to the optical axis with the distance between the curvature radius in the sub-scanning direction and the optical axis; and
an optical system disposed between said light source and said rotating polygonal mirror for converging said optical beams emitted from said light source with respect to said sub-scanning direction and making said optical beams diagonally incident upon, with respect to said optical axis of said scanning lens, said reflective surface of said rotating polygonal mirror to form an elongated shape in said main scanning direction, said optical scanning making said optical beams obliquely incident upon, with respect to said optical axis of said scanning lens.

2. An optical scanning apparatus according to claim 1, wherein the lateral magnification of said scanning lens is arranged to be 3 to 5.

3. An optical scanning apparatus according to claim 1, wherein said scanning lens comprises a first lens having rotationally symmetric surface on both sides thereof and a second lens having a rotationally symmetric surface and said aspheric surface.

4. An optical scanning apparatus according to claim 1, wherein said optical system comprises a collimator lens for making said optical beams emitted from said light source in parallel and a cylindrical lens for converging said optical beams from said collimator with respect to said sub-scanning direction.

5. An optical scanning apparatus according to claim 1, wherein said scanning surface comprises a photosensitive drum surface and is used in a laser printer.

6. A laser scanning apparatus for use in a laser printer for scanning beams emitted from a laser source reflected by a rotating polygonal mirror and converging said beams to the surface of a photosensitive drum, comprising:
said rotating polygonal mirror and said surface of said photosensitive drum being disposed in a conjugate imaging relationship with said scanning lens; and
said scanning lens comprising an aspheric surface with an optical axis comprising individual curvature radii in a main scanning direction and a sub-scanning direction, and monotone-increased with the distance between said curvature radius in said sub-scanning direction and the optical axis, wherein said curvature radius in the sub-scanning direction which is monotone-increased is asymmetric with respect to said optical axis.

7. A laser scanning apparatus according to claim 6, wherein the lateral magnification of said scanning lens is arranged to be 3 to 5.

8. A laser scanning apparatus according to claim 6, wherein said scanning lens comprises a first lens having a rotationally symmetric surface on both sides thereof and a second lens having rotationally symmetric surface and said aspheric surface.

9. A scanning lens for converging laser beams scanned by a rotating polygonal mirror on a scanning surface, comprising:
an aspheric surface having an optical axis individual curvature radii in a principle axis thereof and in a conjugate axis thereof, said curvature radius of said conjugate axis asymmetrically increasing with the distance from said optical axis.

10. A scanning lens according to claim 9 further comprising a first lens having first and second lens surfaces which are positioned symmetrically with respect to a rotational axis and a second lens having a third lens surface which is positioned symmetrically with respect to said rotational axis and a fourth lens surface formed by said aspheric surface.

11. An optical scanning apparatus, comprising:

a light source for emitting optical beams;

a rotating polygonal mirror having a reflective surface forming a scanning angle for deflecting said optical beams and scanning a scanning surface, said reflective surface having an elongated shape in a main scanning direction;

a scanning lens having an optical axis disposed between said rotating polygonal mirror and said scanning surface, for imaging said rotating polygonal mirror and said scanning surface in a conjugate relationship with respect to a sub-scanning direction which is perpendicular to the main scanning direction to be scanned by said rotating polygonal mirror and for imaging said optical beams which have been deflected at the reflective surface of said rotating polygonal mirror at a position on said scanning surface in proportion to its scanning angle, said scanning lens including an aspheric surface having individual curvature radii in the main scanning direction and in the sub-scanning direction and arranged such that the focal length in said sub-scanning direction thereof is increased with the distance from the optical axis asymmetrically in the lateral direction, and said curvature radius in said sub-scanning direction is monotone and asymmetrically increased with the distance from the optical axis; and an optical system disposed between said light source and said rotating polygonal mirror for converging said optical beams emitted from said light source with respect to said sub-scanning direction and making said optical beams oblique incident upon, with respect to said optical axis of said scanning lens, said optical system comprising a collimator lens for making said optical beams emitted from said light source parallel and a cylindrical lens for converging said light beams emitted from said collimator lens with respect to said sub-scanning direction.

12. An optical scanning apparatus according to claim 11, wherein the lateral magnification of said scanning lens is arranged to be 3 to 5.

13. An optical scanning apparatus according to claim 11, wherein said scanning lens comprises a first lens having a rotationally symmetric surface on both sides thereof and a second lens having a rotationally symmetric surface and said aspheric surface.

14. An optical scanning apparatus according to claim 11, wherein said scanning surface comprises a surface of a photosensitive drum in a laser printer.

* * * * *